US012513446B1

(12) United States Patent
Sumida

(10) Patent No.: US 12,513,446 B1
(45) Date of Patent: Dec. 30, 2025

(54) EARBUDS WITH TURN WHEEL CONTROL

(71) Applicant: E-filliate, Inc., Rancho Cordova, CA (US)

(72) Inventor: Wesley K. Sumida, Fair Oaks, CA (US)

(73) Assignee: E-filliate, Inc., Rancho Cordova, CA (US)

( * ) Notice: Subject to any disclaimer, the term of this patent is extended or adjusted under 35 U.S.C. 154(b) by 362 days.

(21) Appl. No.: 18/114,667

(22) Filed: Feb. 27, 2023

Related U.S. Application Data

(60) Provisional application No. 63/313,989, filed on Feb. 25, 2022.

(51) Int. Cl.
*H04R 25/00* (2006.01)
*H02J 7/00* (2006.01)
*H02J 50/00* (2016.01)
*H04R 1/10* (2006.01)

(52) U.S. Cl.
CPC .......... *H04R 1/1041* (2013.01); *H02J 7/0045* (2013.01); *H02J 50/005* (2020.01); *H04R 1/1016* (2013.01); *H04R 2420/07* (2013.01)

(58) Field of Classification Search
CPC ... H04R 1/1041; H04R 1/1016; H02J 50/005; H02J 7/0045
See application file for complete search history.

(56) References Cited

U.S. PATENT DOCUMENTS

D448,016 S 9/2001 Arpe
D557,684 S 12/2007 Pundsack
D584,720 S 1/2009 Houy
8,831,266 B1 9/2014 Huang
9,036,855 B2 * 5/2015 Shah .................... H04R 1/1041 381/384
D796,486 S 9/2017 Liu
D872,048 S 1/2020 Dennis
D883,257 S 5/2020 Duddy
2005/0074137 A1 * 4/2005 Bailey .................... G02C 11/06 381/322
2011/0211709 A1 * 9/2011 Szolga ................. H04R 1/1041 381/74
2011/0235834 A1 * 9/2011 Brimhall ................ H04R 25/65 381/314
2012/0033838 A1 * 2/2012 Speckert .............. H04R 25/558 381/315
2015/0063586 A1 * 3/2015 Shah .................... H04R 1/1041 381/74

(Continued)

*Primary Examiner* — Simon King

(74) *Attorney, Agent, or Firm* — Heisler & Associates

(57) ABSTRACT

A body supports a speaker and an ear cushion adjacent a proximal portion thereof. The ear cushion is sized to fit within an ear canal of a user for holding of the earbud in position and directing sound from the speaker into the ear of the user. A distal end of the body supports a turn wheel in a rotational fashion relative to the body. The turn wheel has frictional resistance to rotation relative to the body which is less than friction force between the ear cushion and the inner ear of the user, such that torque applied to the turn wheel causes the turn wheel to rotate relative to the body. Rotation of the turn wheel causes at least one characteristic of sound emanating from the speaker of the earbud to be modified. A charger box is also provided which can contain and wirelessly charge a pair of earbuds.

18 Claims, 4 Drawing Sheets

(56) References Cited

U.S. PATENT DOCUMENTS

| | | | | |
|---|---|---|---|---|
| 2016/0381471 | A1* | 12/2016 | Henriksen | H04R 25/554<br>381/315 |
| 2017/0142511 | A1* | 5/2017 | Dennis | H04R 1/1041 |
| 2017/0280223 | A1* | 9/2017 | Cavarra | G06F 1/1694 |
| 2019/0090044 | A1* | 3/2019 | Boesen | G10K 11/175 |
| 2020/0252715 | A1* | 8/2020 | Zhou | H04R 1/1041 |
| 2021/0195308 | A1* | 6/2021 | Solis | H01F 27/006 |
| 2022/0279263 | A1* | 9/2022 | Le | H04R 1/1041 |
| 2022/0322470 | A1* | 10/2022 | Jang | G10L 19/00 |

* cited by examiner

Fig.5
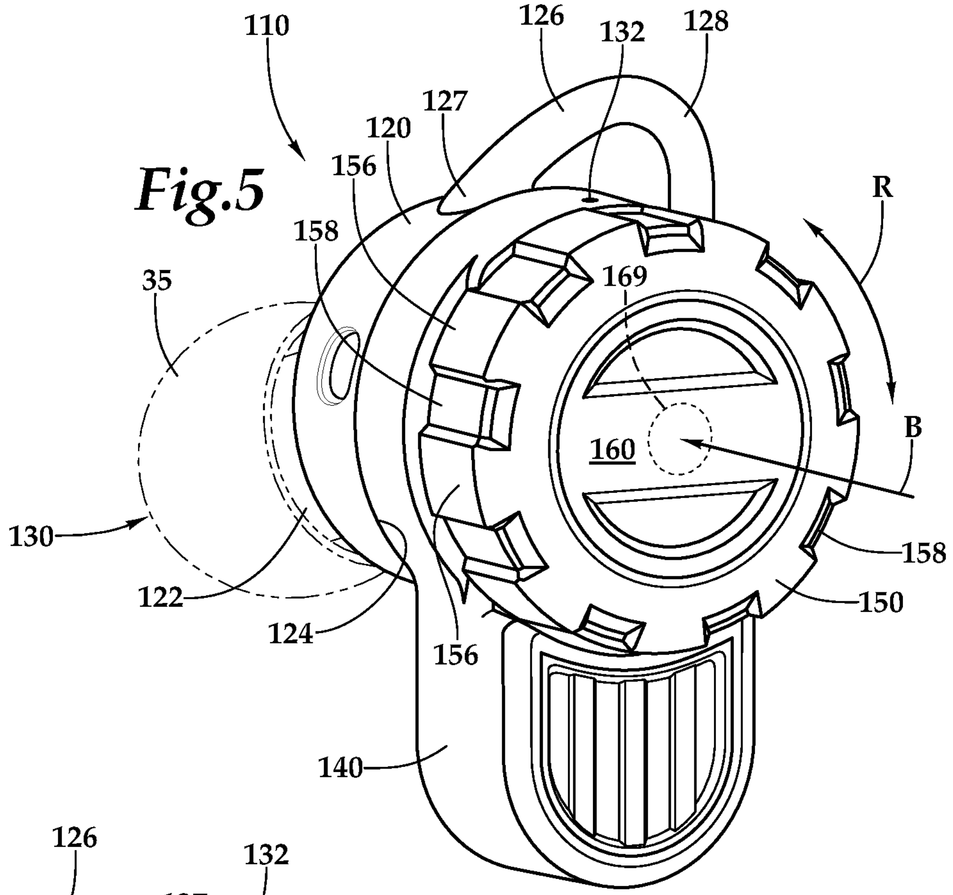
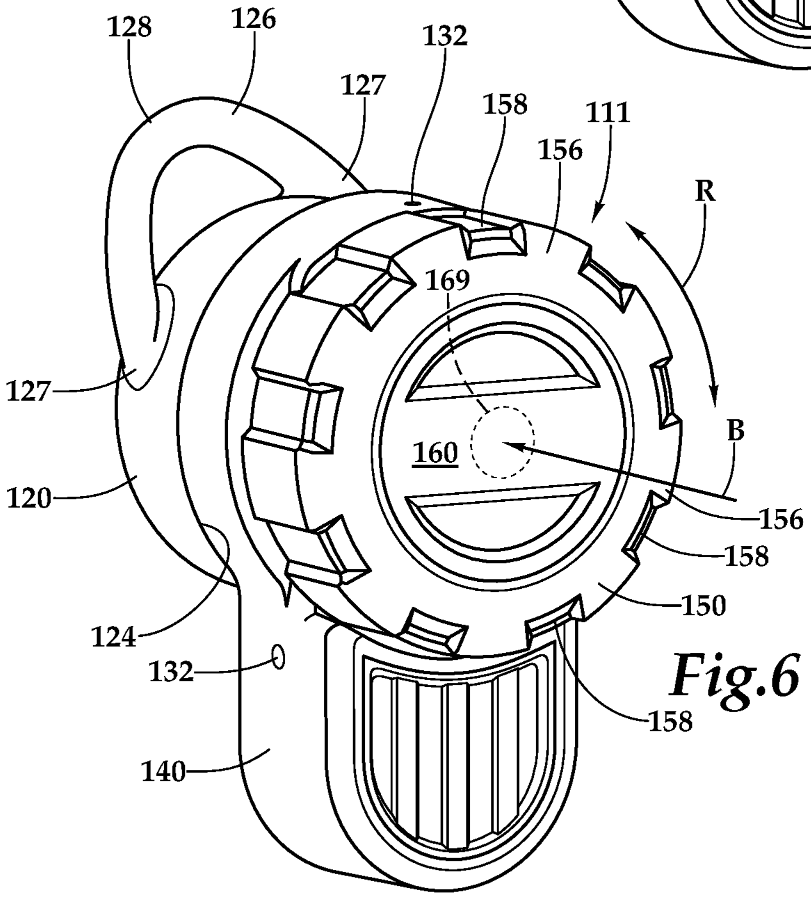
Fig.6

EARBUDS WITH TURN WHEEL CONTROL

CROSS-REFERENCE TO RELATED APPLICATIONS

This application claims benefit under Title 35, United States Code § 119(e) of U.S. Provisional Application No. 63/313,989 filed on Feb. 25, 2022.

FIELD OF THE INVENTION

The following invention relates to sound producing devices worn adjacent to a head of a user and which include manual controls thereon. More particularly, this invention relates to earbud type headphones which hold to the ear and which include a turn wheel rotatable thereon for control of an operational parameter of the earbud.

BACKGROUND OF THE INVENTION

Sound can be provided from an electronic sound file to ears in a variety of ways. Sound can be broadcasted from loudspeakers as one option, such as that which is utilized in public address systems and sound systems for auditoriums. When the sound is to be more personalized, smaller versions of such loud speakers and associated electronics, which "play" or otherwise process the sound file for delivery to the speakers, can be utilized.

When it is desired to maximize the personalization of the sound files to a single individual, typically the sound is provided through headphones or earbuds which are worn by the individual. While some headphones include sound file storage and play electronics thereon, or radio antennas, or similar sound file playing equipment, most typically headphones and earbuds merely receive the sound file from a nearby device which functions as the source of the sound file (or an intermediate source). The source connects to the headphones or earbuds in a wired or wireless fashion, and uses the sound file to drive speakers to emit audible sound corresponding with the sound files, for hearing by the individual.

The choice for delivery of personalized sound, between headphones and earbuds, and between wired and wireless, depends on a variety of factors and personal preferences of the individual. For many individuals, the freedom associated with the wireless choice, and the lightweight and acceptable sound quality of earbuds makes wireless earbuds the most desirable choice.

However, in the prior art wireless earbuds have a variety of drawbacks. An at least partial list of such drawbacks includes limited battery life, difficulty in managing the playing of the sound file without accessing a portable electronic device (or other source device) that is paired with the earbuds, difficulty in pairing the earbuds wirelessly with an associated portable electronic device playing the sound file, and potential for loss of the earbuds during charging. In spite of these drawbacks, wireless earbuds have still become popular for a large segment of consumers. Accordingly, a need exists for wireless earbuds and associated charging and storage which address these deficiencies to provide a more desirable sound file listening experience.

SUMMARY OF THE INVENTION

With this invention, wireless earbuds are provided along with a charge case which together provide a system for listening to sound files wirelessly while avoiding many of the drawbacks of prior art wireless earbuds. The basic earbud of this invention is a general configuration somewhat similar to prior earbuds, including a body with a proximal end with a speaker adjacent thereto and a distal end opposite the proximal end. Appropriate electronics and a battery are stored within or adjacent to the body, and supply power and a sound file to the speaker. An antenna is also associated with the electronics, to allow a sound file to be wirelessly transmitted (i.e. via the Bluetooth protocol) to the earbuds, for processing by the electronics into a form which can be driven by the speaker at the proximal end of each earbud.

While this invention could have most features thereof provided within a single earbud, most typically a pair of earbuds are provided, one for each ear of a user. These two earbuds would typically be nearly identical, but could be slightly different from each other to accommodate mirror image anatomical differences between the left and right ear canals of a typical human user and also to optionally include some details in only one of the pair of earbuds, such as a microphone and/or other subcomponents.

At the proximal end of a central body of the earbud, and adjacent to the speaker, an ear cushion is typically provided. The ear cushion can surround the speaker or be adjacent to the speaker, and generally has a radially symmetrical form and is formed of a soft cushioning material, such as a silicone rubber. Dimensions of the cushion cause a lateral perimeter of the proximal end of each earbud, through the air cushion, to fit snugly but comfortably within the ear canal of the user. As an alternative, or in addition, the earbud can be held to the ear of a user with other attachment structures, or by gravity, separate from or in addition to the ear cushion.

Each earbud has a central axis which extends from the proximal end to the distal end. In one embodiment, the ear cushion is aligned with this central axis at the proximal end of the earbud. A speaker can be inboard of a hollow interior of this ear cushion, for access to the eardrum of the individual wearing the earbud. In one embodiment, ear cushions of different sizes (and/or hardness, resilience, shape, etc.) can be removably attached to the proximal end of the earbuds, such as to provide optimal sizing and/or comfort (and sound performance) characteristics desired by the individual wearing the earbuds. As an alternative, the air cushions could be built into the earbuds more permanently at the proximal end thereof.

In one embodiment, an ear sensor is located on the body on a distal side of the ear cushion, but still closer to the proximal end of the earbud than to the distal end of the earbud. This ear sensor can detect whether or not the earbud is within an ear of an individual. Such a sensor can allow for various subsystems of the earbuds to operate properly. For instance, to save battery life within the earbuds, power to the speakers can be interrupted or reduced to an exceptionally low level if the ear sensor does not detect that the earbud is within an ear canal of the individual.

Other components within or supported by the body of the earbuds would include input coils providing half of a wireless charging circuit coupled to a battery (or other onboard power source). An output power coil within a charging case or other charger (described in detail below in one embodiment) can interact through inductive coupling with this input coil to cause a battery within the earbud to be charged. The body also acts as an enclosure which can contain the battery, various electronics, an antenna, and inputs from switches and other controls at or near a distal end of each earbud.

Controls for the earbuds generally fall into two categories, including push button inputs and turn wheel inputs. The distal end of the body extends along the central axis of the earbud and terminates at a hub. This hub can either be rotatably supported by the body or can be fixed relative to the body. Preferably, a most distal surface of this hub is a toggleable button, which can be depressed/pushed axially along the central axis of the earbud (or at least closer to axial than perpendicular to this central access). When such a switch is toggled by being depressed, various different functions of the earbud can be controlled. For instance, if the earbud is being used for telephone calls through a smartphone that is wirelessly coupled (also called "paired") to the earbuds, pushing of this button on the hub (or the whole hub itself being a button) can include pushing to answer a call, pushing to hang up a call, pushing to pause music when no call is happening, etc. In one embodiment, pushing of the button on the hub (or the whole hub itself) can cause different actions at the left earbud than at the right earbud. In one embodiment, the ear sensor has less elaborate controls associated with this button when one of the ear sensors detects that one of the earbuds is not within an ear of an individual, so that phone calls can successfully occur with a single earbud.

In one embodiment, a built-in microphone is also formed within this most distal surface of the hub. Such a microphone can allow for an individual wearing the earbuds to communicate, such as in a phone call, with voice from the individual picked up by this microphone. In other embodiments, a separate microphone can communicate wirelessly either with the earbuds or directly with the portable electronic device which is driving the earbuds.

A turn wheel is provided on a perimeter of the hub, which is radially spaced from the central axis of each earbud. This turn wheel can be fixed to the hub so that the turn wheel and hub turn together relative to the body, or the turn wheel can rotate relative to the hub, with the hub substantially remaining fixed to the body (other than the hub being able to be depressed slightly as a button when axial forces or nearly axial forces are applied to the hub).

To facilitate rotation of the turn wheel, bearings can be provided. These bearings can be simpler in one embodiment or more complex in other embodiments. As one option, a simple journal bearing can be provided with mating surfaces sized similar to each other and with materials selected to minimize friction therebetween, and allowed to turn the turn wheel to rotate either relative to the hub or relative to the body.

In one embodiment, detents are provided which provide a slightly greater amount of rotational resistance for the turn wheel at regular intervals. For instance, such detents could provide slight resistance to rotation every 30°, so the 12 different detents would be encountered before a complete rotation of the turn wheel would occur. In one embodiment, a stop can be provided so that the turn wheel has a maximum amount of rotation in either direction, before it comes to the stop and can no longer be rotated.

To provide detents in one embodiment, magnets are provided within the turn wheel and corresponding magnets are provided within the hub or body. When similar poles approach each other, resistance is encountered. When different polls are encountered, attractive forces are generated. Thus, a force profile as the turn wheel rotates would vary. In another embodiment, a shape of bearing surfaces can be selected so that as rotational displacement of the turn wheel occurs relative to the hub (or relative to the body), an amount of tolerance and associated friction varies. In other embodiments, springs and detent balls can be utilized and recesses strategically provided to cause the turn wheel to encounter detents as the turn wheel is rotated. As an alternative, no detents can be provided, and the turn wheel can be allowed to rotate freely (or with a uniform amount of friction).

At least one sensor is provided between the turn wheel and hub (or between the turn wheel and the body) which sensor detects at least one rotational aspect of the turn wheel, such as a rotational position or rotational motion of the turn wheel. This sensor could be in the form of a rotational transducer, such as a variable resistor/potentiometer which causes a resistance (or other measurable value) to be modified based on the rotational position of the turn wheel. In other embodiments, the sensor can detect a rotational position of the turn wheel based on criteria sensed by the sensor. The sensor then feeds information as to the position (or motion) of the turn wheel to the electronics within the body, to cause the sound file to have a characteristic thereof modified according to programming of the electronics and the desired configuration for operation of the earbuds.

In one embodiment, the turn wheels of the right earbud and left earbud control different characteristics of operation of the sound file. For instance, the right earbud, when the turn wheel is rotated, can be configured to cause volume to go up or down (depending on whether the turn wheel is rotated clockwise or counterclockwise) for sound emanating from each of the speakers of each of the earbuds. The left earbud, when its turn wheel is rotated, can cause tracks within the sound file to skip forward or repeat, depending on whether the left turn wheel is rotated clockwise or counterclockwise. As a further alternative, each of the terminals could be configured to control volume, with each turn wheel controlling the volume of the associated earbud for instance.

The turn wheel preferably includes ribs at perimeter edges thereof opposite the hub. These ribs enhance grippability for fingers of a user. A user can merely reach up to ears of the individual and readily rotate the turn wheel to change a characteristic of the sound file, according to operation of this invention as described in detail above. Importantly, the turn wheel has sufficiently low resistance to rotation that this resistance to rotation is less than an amount of friction between the ear cushions and the ear canal of the individual. In this way, when torque is applied by an individual to the turn wheel, the turn wheel rotates relative to the hub (or relative to the body) without rotating the earbud within the ear canal at the proximal end of the earbud. Thus, positioning of the earbuds is not altered by turning the turn wheel, but rather only the turn wheel is caused to be adjusted relative to the body of the earbud.

In one example embodiment, similar to those described above where the hub remains stationary but the turn wheel rotates relative to the hub, the button on the end of the hub could remain fixed while the turn wheel turns. This keeps the button from rotating and also keeps the microphone or any other structures associated with the end of the hub remaining stationary. The turn wheel would be accessible at an outer perimeter thereof for gripping and rotation relative to the hub, with the body and end of the hub remaining stationary relative to each other (and relative to the ear of the wearer when in use).

While in many embodiments this end of the hub would consist merely of a button, and perhaps also a microphone, in other embodiments, the end of the hub could be enlarged both axially away from the body and radially in at least one direction away from a pivoting axis of the hub. Such an enlarged hub free end (also referred to as an elongate housing) would remain stationary relative to the body. The turn wheel would still rotate relative to the hub. If this elongate housing extends radially from a central axis of the hub, and such a radial extension is greater than a radius of the turn wheel (with the turn wheel rotating about the pivoting axis provided by the hub for the turn wheel), portions of the turn wheel would be encapsulated within portions of the elongate housing which extend significantly radially away from the pivoting axis of the hub. However, sufficient amounts of the turn wheel are not encapsulated by the elongate housing such that the turn wheel can be gripped and turned by a user. In one embodiment, only about ¼ of the turn wheel is encapsulated by this radial extension of the free end of the hub. In other embodiments, perhaps up to ¾ of the turn wheel might be encapsulated/enclosed by portions of the elongate housing, with still sufficient amounts of the turn wheel exposed to facilitate access by a finger of a user and rotating thereof.

By providing the elongate housing with a larger size and extending beyond a turn wheel, structures such as antennas, batteries, battery wireless charging coils and microphones can be enlarged and/or more desirably strategically placed for optimal performance of the earbuds. For instance, the microphone could be placed near a radial tip of a radial extension of the elongate housing, and generally pointing in a direction closer to a mouth of a wearer. An antenna such as a Bluetooth antenna could be encased within this free end of the hub and have sufficient size and orientation to best communicate with the other earbud and/or a smart phone or other portable electronic device or other source of sound files and other signals transmitted to the earbud. The free end of the hub can include wiring and associated electronics which are coupled to the body and other portions of the earbud, such as along an interior of a hollow central shaft extending along a pivoting access of the hub, to allow for interconnection of electronics, whether they are located within the body or the free end of the hub. Such an elongate housing, or other structures (e.g. an arch bar) extending from the body can also interact with an outer ear of a user to help keep the earbud adjacent to the user's ear and avoid rotation when the turn wheel is rotated, either in addition to friction of the ear cushion or as a replacement to the ear cushion.

While the earbuds could be provided as described above without any associated charger, and existing prior art charger equipment could be utilized, most preferably according to one embodiment of this invention, a charge case (also called a charge box) is also provided. The charge case includes a base (also called an outer housing) and a drawer. The drawer slides in and out of the base which acts as a protective covering for the overall charger. The drawer and/or the base preferably include a battery therein. Support is provided on the base or the drawer which can be coupled by a cord to a power source so that electric power can be fed to the charger periodically, to charge the battery therein. As an option, the charger could be provided without a battery and would only operate when plugged into an electric power source through this cord.

Preferably, the drawer has two cradles/recesses therein with each cradle supporting one earbud. These cradles have a lower recess into which a proximal end of an earbud is placed. A power output coil is located adjacent to this recess and is preferably oriented for optimal charging of a battery of the earbud adjacent thereto, through the input coil of the earbud. These cradles also preferably have wide finger slot openings on opposite lateral side thereof to make it easy for an individual to reach opposing lateral sides of the earbuds to grab them and remove them from the recesses of the charging cradles.

Most preferably, the drawer has water tight fittings around the perimeter thereof, so that when the drawer is slid fully into the base, a watertight container is provided for the earbuds. Similarly, when the drawer is closed, this can activate charging of the earbuds. Lights on an exterior of the drawer (and/or base) can provide operational status for the charger. One light can indicate whether earbuds are actively being charged and/or how full of charge the earbuds are. Other lights can indicate how full of charge a battery is that is associated with the charger. A lanyard loop can be provided to allow for a lanyard to hold the case, such as around a neck of a wearer, or to some other structure. This lanyard loop can double as a pull handle for the drawer to pull it out of the outer housing of the charger.

While the charger case would typically not have any antenna or complex control electronics therein (other than to control the lights and to control whether the earbuds are currently being charged or not), the charge case could have other more active electronics. The charge case could function as a portable electronic device which could communicate wirelessly with the earbuds and transmit sound files thereto, so that the charge case could in one embodiment be in the form of a portable music player itself. As a further option, the charge case could include a portable loudspeaker thereon. In one embodiment, if the earbuds run out of charge, they can be placed into the recesses of the cradles, and the charge case can continue to play the sound files that were being played through the earbuds from such a loud speaker. Buttons could be provided on the charge case to allow for control of such sound files, such as to pause playing of the sound.

OBJECTS OF THE INVENTION

Accordingly, a primary object of the present invention is to provide at least one earbud with a turn wheel thereon which can be rotated so that operation of the earbud can be controlled thereby.

Another object of the present invention is to provide a pair of earbuds with at least one turn wheel on at least one of the pair of earbuds and with rotation of the turn wheel causing control of operation of each of the earbuds to be modified.

Another object of the present invention is to provide an earbud with an air cushion sized to fit within an ear canal of a user with greater friction between the ear cushion and the ear canal then friction resisting rotation of a turn wheel rotatably mounted to the earbud.

Another object of the present invention is to provide at least one earbud with a turn wheel thereon and which also includes a push button control on at least one of the earbuds, so that both push button control and turn wheel control of operation of the earbud can be provided by an individual manipulating the push button and/or turn wheel.

Another object of the present invention is to provide an earbud with a body having a speaker and ear cushion adjacent to a proximal end of the body and a turn wheel rotatably mounted at least indirectly to the body, with the turn wheel located adjacent to a distal end of the body with spacing between the ear cushion and the turn wheel sufficiently great that the turn wheel can be rotated without obstruction by the outer ear of an individual while the ear cushion is located within the ear canal of the individual.

Another object of the present invention is to provide a method for controlling operation of an earbud including rotating a turn wheel which can be rotated to affect operation of the earbud.

Another object of the present invention is to provide a charging device for at least one earbud which earbud includes a charging coil input and which charging device includes a charging coil output for electric charging of an electric power source of the earbud from the charging device.

Other further objects of the present invention will become apparent from a careful reading of the included drawing figures, the claims and detailed description of the invention.

BRIEF DESCRIPTION OF THE DRAWINGS

FIG. 5 is a perspective view from a distal side of an alternative right earbud featuring an elongate housing between a body and turn wheel of the earbud.

FIG. 6 is a perspective view from a distal side of an alternative left earbud corresponding with the right earbud of FIG. 5.

DESCRIPTION OF THE PREFERRED EMBODIMENT

Figure 1:
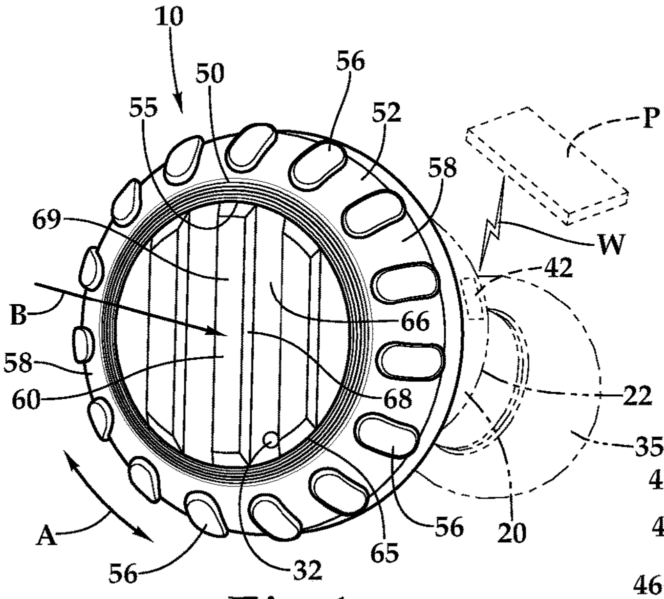
FIG. 1 is a perspective view from a distal side of a right earbud according to this invention and illustrating wireless communication with a personal electronic device, such as a smart phone.

Referring to the drawings, wherein like reference numerals represent like parts throughout the various drawing figures, reference numeral 10 is directed to an earbud (FIGS. 1 and 2) that is configured to be placed with a portion thereof into an ear canal E (FIG. 3) of a user (along arrow C) for the earbud 10 to be held therein. The earbud 10 is typically configured as one of a pair, with the earbud 10 being configured for use in a right ear canal, while a left earbud 11 (FIGS. 3 and 4) is configured for use in a left ear canal C of a user (or vice versa). At least one of the earbuds 10, 11 features a turn wheel 50 which rotates (along arrow A of FIGS. 1-4) relative to the other portions of the earbuds 10, 11 and which rotation causes a characteristic of sound emanating from the earbuds 10, 11 to be modified by such rotation.

In essence, and with particular reference to FIGS. 1-4, basic details of the earbuds 10, 11 are described according to a first example embodiment. The earbud 10 (and earbud 11) includes a body 20 with a proximal portion opposite a distal portion. The proximal portion of the body 20 supports a speaker 30 and an ear cushion 35 thereon, the ear cushion 35 facilitating support of the earbud 10 within an ear canal E of a user (insertion along arrow C of FIG. 3). The body 20 also supports a power source 40 and various electronics to facilitate operation of the earbud 10 in various ways which are known to exist within at least some earbud type headphones of the prior art.

A turn wheel 50 is rotatably supported (about arrow A of FIGS. 1-4) adjacent the distal portion of the body of the earbud 10. This turn wheel 50 can be gripped and rotated, such as by fingers of a user, and such rotation (or rotational position) can be detected by sensors/electronics associated with the earbud 10. Friction resistance to such turn wheel 50 rotation is less than friction F resistance between the ear cushion 35 and the ear canal E, such that torque applied to the turn wheel 50 causes the turn wheel 50 to rotate relative to the body 20 (and/or other portions of the earbud 10), rather than such torque merely causing rotation of the ear cushion 35 within the ear canal E of the user.

Such rotation of the turn wheel 50 or angular position/state of the turn wheel 50 relative to other portions of the earbud 10 is sensed and interpreted according to a control system of this invention. Characteristics of sound emanating from at least one of the earbuds 10, 11 are modified by such a turn wheel 50 rotation of at least one of the turn wheels 50 of at least one of the earbuds 10, 11. A hub 60 can either support the turn wheel 50 and rotate relative to the body 20 of the earbud 10 or the hub 60 can be fixed relative to the body 20 of the earbud 10 and the turn wheel 50 can rotate relative to the hub 60.

A charger box 70 (FIGS. 9 and 10) is also optionally provided along with at least one of the earbuds 10 and typically a pair of earbuds 10, 11. The charger box 70 features a drawer 80 with recesses 86 which can support earbuds 10, 11. The charger box 70 is configured to charge a power source of earbuds 10, 11, preferably wirelessly. The charger box 70 is preferably itself also wireless and includes an internal battery 72 or other power supply. The charger box 70 thus acts as a convenient storage location for the earbuds 10, 11 when not in use, and also facilitates charging of the earbuds 10, 11 in a convenient wireless manner, and also can act as a portable electric power bank for the earbuds, 10, 11 and also potentially for other electronic devices, such as one or more personal electronic devices P.

More specifically, and with continuing reference to FIGS. 1-4, basic details of the body 20 of the earbud 10 (and corresponding earbud 11) are described according to this first example embodiment. Details of each earbud 10, 11 in this example embodiment are typically identical, except for optionally having left ear or right ear anatomy/geometry differences and optional inclusion of some details such as a microphone on only one of the earbuds 10, 11, and optionally one earbud 10 having more functionality than the other earbud 11, or one earbud 10 having at least some control over the other earbud 11.

The body 20 (also called the central body) generally includes an outer wall surrounding interior structures which are contained within the body 20 and cause the earbud 10 to function appropriately. In general, this function is to receive an electromagnetic signal through an antenna 42, to process this electromagnetic signal through appropriate electronics 44 to produce an electronic signal which can then be sent to the speaker 30 supported by the body 20 in a manner causing the speaker 30 to emit sound S which can be heard in an ear of a user in which the earbud 10 is located. The electronics 44 as well as the antenna 42 and speaker 30 are powered by a power source 40, such as a battery contained in or at least supported by the body. Optionally, the electronics 44 can include some amount of memory for at least temporary storage of files, such as sound files within the earbud before this electronic signal is sent to the speaker 30 to drive this speaker 30 and emit the sound S.

In some embodiments (FIGS. 5-8) an at least partially separate housing 140, 240, 340 is appended to the body 20 and contains at least some of these components which facilitate operation of the earbud 10. In this first example embodiment no such auxiliary housing is provided. Components supported by the body 20 could as an option be at least partially outside of the outer wall and still be supported by the body 20.

The body 20 and the earbud 10 overall include a proximal portion and a distal portion. The proximal portion (also called the proximal end) is that portion of the body, 20 and earbud 10 closest to the ear canal E of the user when the earbud 10 is in position for use. The distal portion (also called the distal end) is located further from the ear canal E than the proximal end when the earbud 10 is positioned for use.

The body 20 thus has its proximal portion supporting the speaker 22 adjacent thereto and located closer to the proximal end than to the distal end. In this example embodiment, a cushion 35 surrounds the speaker 22. The air cushion 35 is preferably configured as a somewhat spherical or cylindrical structure with a diameter similar to a diameter of the ear canal E (FIG. 3) of a target user for the earbud 10. In one embodiment, the earbuds 10 are provided with multiple ear cushions 35 of different sizes and/or other characteristics, such as resiliency, flexibility, malleability, and surface friction characteristics, and potentially also shape characteristics, so that a user can select an ear cushion 35 which best interfaces with corresponding anatomy of the ear canal E of the user and with comfort and said quality attributes which are most desirable.

The goal of the ear cushion 35 is to fit within the ear canal E (FIG. 3) and to have sufficient friction F at an interface between the ear canal E and the cushion 35, so that more resistance to rotation of the ear cushion 35 relative to the ear canal E is provided than an amount of resistance to rotation of the turn wheel 50 relative to the body 20 and/or other portions of the earbud 10. In this way, when torque is applied to the turn wheel 50 (along arrow A of FIGS. 1-4) the turn wheel 50 rotates relative to the body 20, rather than the body 20 rotating relative to the ear canal E.

A secondary function of the ear cushion 35 is to exhibit a comfortable fit within the ear canal E of the user. A tertiary function of the ear cushion 35 is to position the speaker 22 efficiently and accurately to direct sound S from the speaker 30 into the ear of the user. The body 20 typically includes a speaker support 22 inboard of the ear cushion 35 which supports the speaker 30 thereon. The body 20 also include a turn wheel support 24 on the side of the body 20 adjacent to the turn wheel 50. In this first example embodiment, the body 20 has a somewhat spherical form with a proximal end including the speaker support 22 thereon and the distal end supporting the turn wheel support 24 thereon. In one embodiment, the body 20, speaker 30 and air cushion 35 are selected from prior art earbud configurations either with no modification thereto, or only slight modifications thereto.

The body 40 also preferably supports a location sensor 46 thereon and a charging input coil 48. The location sensor 46 senses whether the earbud 10 is positioned within the ear canal C or is in some other location. This location sensor 46 can thus provide various beneficial functions, such as to put the earbud 10 in a power saving mode when it is detected that it has been removed from adjacent to (or within) the ear canal E.

The charging input coil 48 can be placed adjacent to an output power charging coil, such as associated with a charger for the wireless transfer of electric power to the charging coil 48 within the earbud 10, utilizing inductive coupling power transfer. A microphone 32 is also preferably provided on at least one of the earbuds 10 such as on a portion of the body or on a portion of the turn wheel 50 or hub 60. The microphone 32 is wired into the electronics 44 within the body 20, so that a sound signal from the microphone 32 can be processed by the electronics and optionally passed to the antenna 42 for transfer to an adjacent device, such as a personal electronic device P (e.g. a smart phone such as an iPhone provided by Apple corporation of Cupertino California), such as for allowing for a phone call to be made utilizing the earbud 10. Other microphone functions can include sound based control of operation of the personal electronic device P and/or the earbuds 10, 11, or voice memos or other audio files to be transmitted from the earbud to the personal electronic device P, such as utilizing an electromagnetic signal transfer protocol, such as Bluetooth. Such a Bluetooth signal transfer protocol or other electromagnetic signal transfer protocol between the antenna 42 and the personal electronic device P (along wireless transmission path W of FIG. 1) can also allow for electronic sound files to be transferred from the personal electronic device P to the antenna 42 of the earbud 10 for delivery to the speaker 30 for listening by a user wearing the earbud 10.

Figure 2:
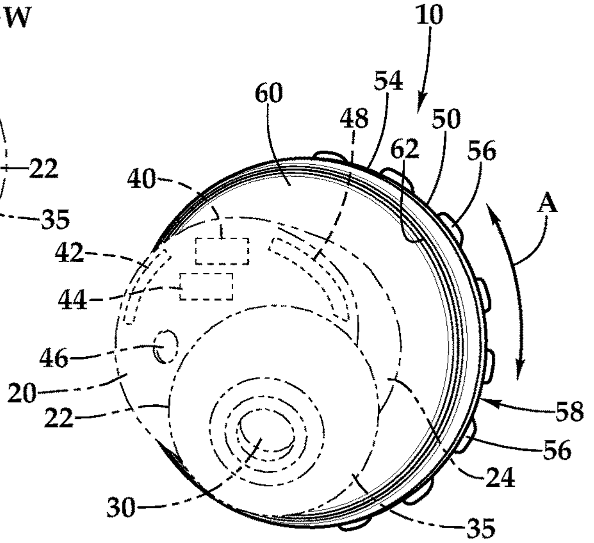
FIG. 2 is a perspective view from a proximal side of that which is shown in FIG. 1.
Figure 3:
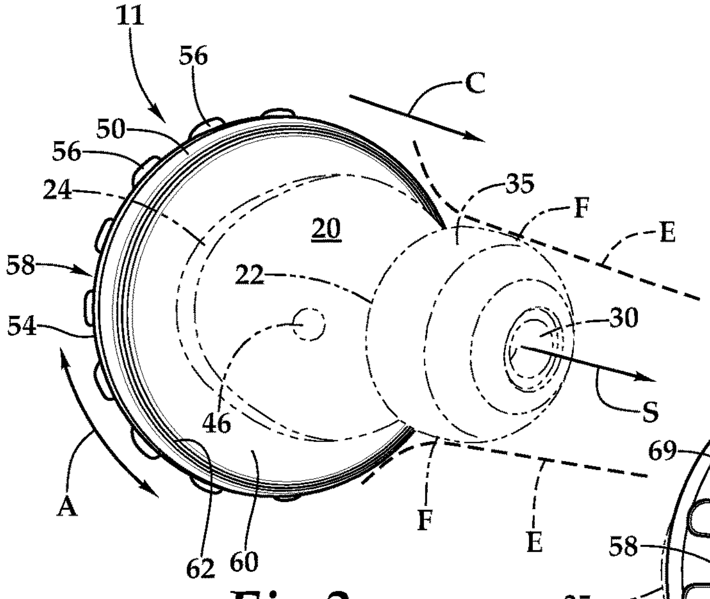
FIG. 3 is a perspective view from a distal side of a left earbud corresponding with the right earbud of FIG. 1.
Figure 4:
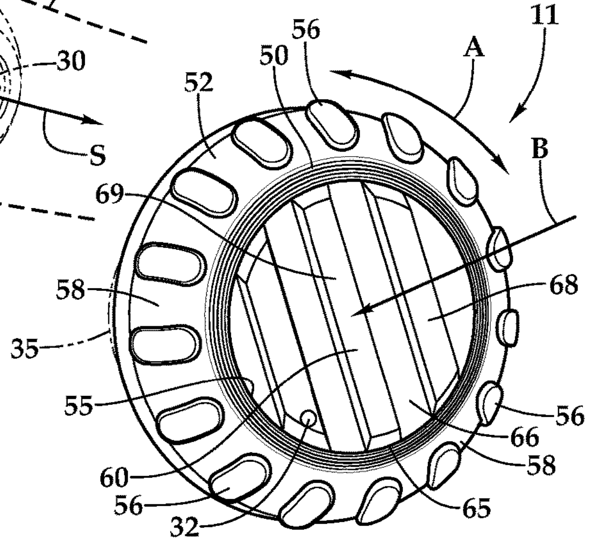
FIG. 4 is a perspective view from a proximal side of that which is shown in FIG. 3.

With particular reference to FIGS. 1 and 4, details of the turn wheel 50 and hub 60 are described according to this example embodiment earbud 10. Generally, the turn wheel 50 can either be rotationally supported by the hub 60 with the turn wheel 50 rotating relative to the hub 60, or the turn wheel 50 and hub 60 can be fixed together with the hub 60 including a body support 62 in the form of a bearing and such a body support 62 generally acting as an axle that is rotationally supported by portions of the body 20 to facilitate rotation of the hub 60 relative to the body 20. If the hub 60 is affixed to the body 20 through the body support 62, an interface between the turn wheel 50 and hub 60 is a rotational interface. In another configuration, the turn wheel 50 is capable of rotation (along arrow A of FIGS. 1-4) which is generally rotation about a rotational axis aligned with a central line of the hub 60 and passing through the body 20 and through the speaker 30. While the earbud 10 is preferably close to radially symmetrical about this rotational axis, it is most preferably slightly altered from purely radially symmetrical to best conform to anatomy of either the left or right ear canal E of a user, as generally depicted in FIGS. 1-4.

The turn wheel 50 is preferably sufficiently far from the ear cushion 35 and speaker 30 that the turn wheel 50 is located outside of the ear canal E when the ear cushion 35 is located within the ear canal E. The turn wheel 50 can thus be easily engaged by at least one finger of the user and torque applied to cause rotation of the turn wheel 50, about arrow A (FIGS. 1-4).

The turn wheel 50 generally includes an outer annulus 52 oriented between a perimeter surface 54 and an inner race 55. The perimeter surface 54 is generally circular and the inner race 55 is preferably generally circular. The outer annulus 52 preferably has a radially symmetrical form between the perimeter surface 54 and the inner race 55. Ribs 56 are presented upon this outer annulus 52 of the turn wheel 50. Troughs 58 are provided between the ribs 56. At least one finger of a user can engage the ribs 56 and/or troughs 58 in a tactile manner and torque applied, which in turn causes the turn wheel 50 to rotate relative to the hub 60 (or for the turn wheel 50 and hub 60 to rotate together relative to the body 20).

In this example embodiment, the outer annulus 52 has a contour which is generally frusto-conical in one form, or semi-spherical in a second form. Fingers can engage the outer annulus 52 either from a perimeter outer edge thereof to apply rotational torque to the turn wheel 50, or can engage the outer annulus 52 more from a distal direction and still engage the ribs 56 and troughs 58 to engage and rotate the turn wheel 50 relative to the body 20. In one embodiment, the ribs 56 and troughs 58 each have a similar radial size and are alternating with a trough 58 between each rib 56. In one embodiment, the ribs 56 extend the majority of the distance between the perimeter surface 54 and the inner race 55.

A sensor senses rotation of the turn wheel 50 relative to the hub 60 (or rotation of the hub 60 relative to the body 20). This sensor at least detects some aspect of rotational position and/or rotational velocity and/or rotational change in position and uses this sensed rotational information to control some characteristic of the operation of the earbud 10. For instance, the sensor could in one embodiment merely sense whether rotation of the turn wheel 50 is occurring. In another embodiment, the sensor could detect whether one of the turn wheels 50 is rotating in a clockwise or in a counterclockwise direction. In a further embodiment, an amount of angular displacement of the turn wheel can be measured. In a still further embodiment, an angular position of the turn wheel can be sensed. As a further option, rotational velocity or some other motion characteristic such as angular acceleration/angular velocity, could be sensed and utilized as an input signal for controlling at least one characteristic of operation of the earbud 10.

Examples of characteristics which can be controlled by rotation of the turn wheel 50 include advancing to a next track in an audio file played by the earbud 10, adjusting volume, switching to a next audio file in a sequence of audio files, and a variety other earbud control characteristics. These control characteristics can either be predetermined or programmable by a user, such as through a programming interface on the personal electronic device P.

When the turn wheel 50 rotates relative to the hub 60, the inner race 55 is rotatably supported by an outer race 65 on an outer perimeter of the hub 60. The hub 60 would also include a face 66 inboard of this outer race 65. The face 66 includes a texture 68 which is tactile in nature to facilitate engagement, such as with a finger of the user. This face 66 can be configured as a push button 69 as one option, such as to allow for pushing (along arrow B of FIGS. 1 and 4) of this push button 69, resulting in control of some characteristic of the earbud 10.

The outer race and inner race 55, 65 are particularly configured to mesh together in a manner allowing for rotational support of the turn wheel 50 relative to the hub 60 in a low friction manner. As one example, a ball bearing annular race is provided between the inner race 55 and outer race 65. Other forms of bearings can alternatively be utilized. Preferably this bearing is a low friction bearing so that friction forces therein are less than friction F between the ear cushion 35 and the ear canal E, so that torque applied to the turn wheel 50 causes rotation of the turn wheel 50 relative to the hub 60 or other portions of the body 20, rather than rotation of the earbud 10 relative to the ear canal E. In this example embodiment, the face 66 supports the microphone 32. The texture 68 is in the form of a series of linear large ribs spaced apart by long linear troughs in an alternating pattern to facilitate engagement by a user, such as with a finger.

In another embodiment, the earbud 10 and corresponding earbud 11 have similar turn wheels 50 and hubs 60. However, these turn wheels 50 and push buttons 69 of these two earbuds 10, 11 are programmed to control different characteristics of operation of the earbuds. Earbuds 10, 11 are coupled together electronically, either through direct communications therebetween or through a common communication with a common personal electronic device P. Such separate controls could, for instance, involve rotation of a turn wheel 50 associated with one earbud 10 controlling volume, while rotation of the other turn wheel 50 of the other earbud 11 controlling which track in an audio file is being played, or controlling speed of playback of the sound file. Similarly, the push buttons 69 associated with each earbud 10, 11 could be distinctly programmed to perform different functions, such as with one push button 69 being a pause button and the other push button 69 being a button to commence a phone call, request attention from a personal digital assistant software program running on the personal digital assistant P, or some other function.

With particular reference to FIGS. 5 and 6, details of an alternative embodiment earbud featuring an elongate housing is described. With this earbud 110, an alternate body 120 is provided with a generally similar function to the body 20 of the earbud 10 described above. The alternate body 120 thus includes a speaker support 122. A speaker 130 is coupled to the alternate body 120 through the speaker support 122. A microphone 132 and an ear cushion 135 also supported by the earbud 110 similar to with the earbud 10 described in detail above.

Uniquely, the alternate body 120 includes a housing support 124 which holds an elongate housing 140 adjacent to the alternate body 120. Furthermore, an arch bar 126 is attached to the alternate body 120 through a pair of feet 127 leading to an apex 128 defining a portion of the arch bar 126 most distant from the feet 127.

The elongate housing 140 can include at least a portion of the antenna 42, electronics 44, location sensor 146 and/or charging coil 48, as well as optionally also at least a portion of the power source, 40 and/or the microphone 32. The elongate housing 140 provides additional volume within the overall earbud 110 to facilitate function of the earbud 110. The location sensor 146 can also optionally be provided on the elongate housing 140 or elsewhere on the alternate earbud 110 for detection of whether the earbud 110 is adjacent to or within portions of an ear of a user or not.

Furthermore, the elongate housing 140 and/or the arch bar 126 can interface with anatomy of the outer ear of a user to further support the alternate body 120 relative to the ear anatomy of a user to resist rotation of anything other than a turn wheel 150, when the turn wheel 150 has torque applied thereto. For instance, if the earbud 110 does not have an ear cushion 135, or if the ear cushion 135 does not have enough friction F relative to the ear canal E (FIG. 3), interaction between the arch bar 126 and/or elongate housing 140 and the outer ear can resist rotation of the alternate earbud 110, so that only the turn wheel 150 rotates relative to other portions of the earbud 110.

With this alternate earbud 110, a turn wheel 150 is provided having a slightly different geometry than that depicted in the embodiment above for the turn wheel 50. In particular, turn wheel 150 (FIGS. 5 and 6) has a generally cylindrical shape and with a plurality of faceted ribs 156 alternating with faceted troughs 158 on an outer circumference of the turn wheel 150. A hub 160 is located inboard of the turn wheel 150, with the turn wheel 150 rotating relative to the hub 160 (along arrow R of FIG. 5 or 6) or with the turn wheel 150 and hub 160 rotating together relative to other portions of the alternate earbud 110. The hub 160 can support a push button 169 thereon as an option. At least one button can alternatively or in addition be provided upon the elongate housing 140. If desired, the alternate earbud 110 can also include a charging coil which can be located either on the alternate body 120 or on the elongate housing 140 (or some combination of) to facilitate wireless charging of the alternate earbud 110.

Figure 7:
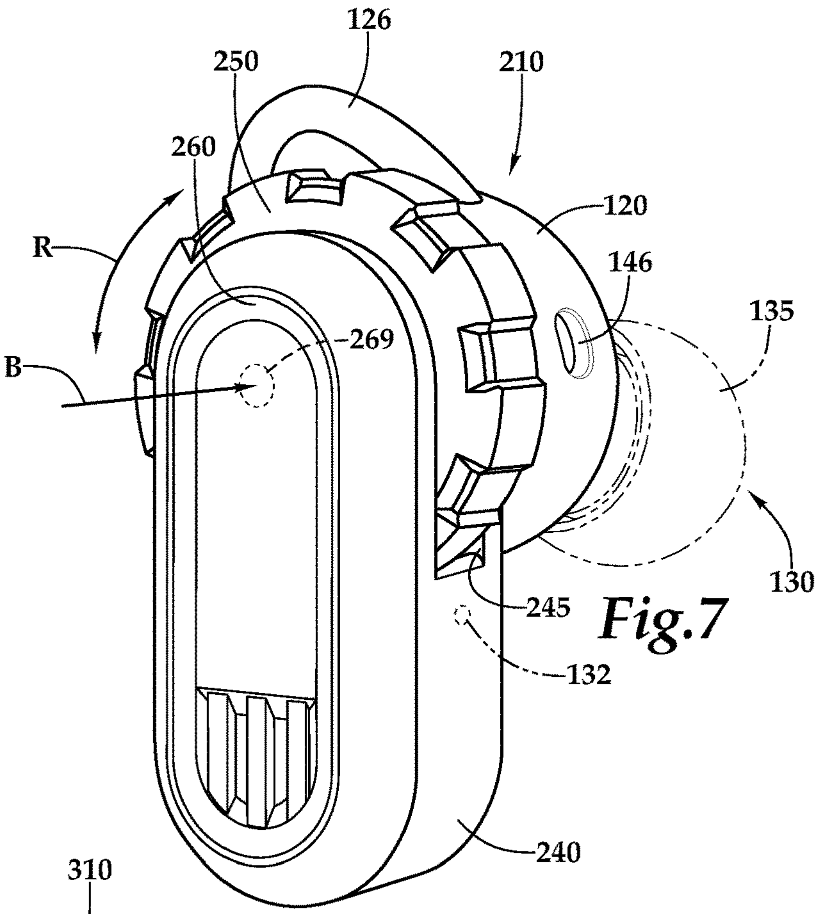
FIG. 7 is a perspective view from a distal side of a modified alternative earbud featuring an elongate housing and with a turn wheel partially located within a slot in the elongate housing.

With particular reference to FIG. 7, details of a modified alternate earbud 210 are described. This modified alternate earbud 210 features an elongate housing 240 with a partially enclosed and recessed turn wheel 250. The modified alternate earbud 210 generally includes an alternate body 120 supporting a speaker 130 and ear cushion 135. The unique modified elongate housing 240 is provided along with an arch bar 126 similar to that of a prior disclosed embodiment.

The modified elongate housing 240 includes a slot 245. A recessed turn wheel 250 is rotatably supported so that portions of the turn wheel 250 extend out of this slot 240. In this embodiment, a majority of the recessed turn wheel 250 is still accessible, extending from an end of the modified elongate housing 240. Furthermore, a modified hub 260 is provided which is integrated into the modified elongate housing 240 and a push button 269 can optionally be provided on this modified hub 260 and/or on the modified elongate housing 240.

Figure 8:
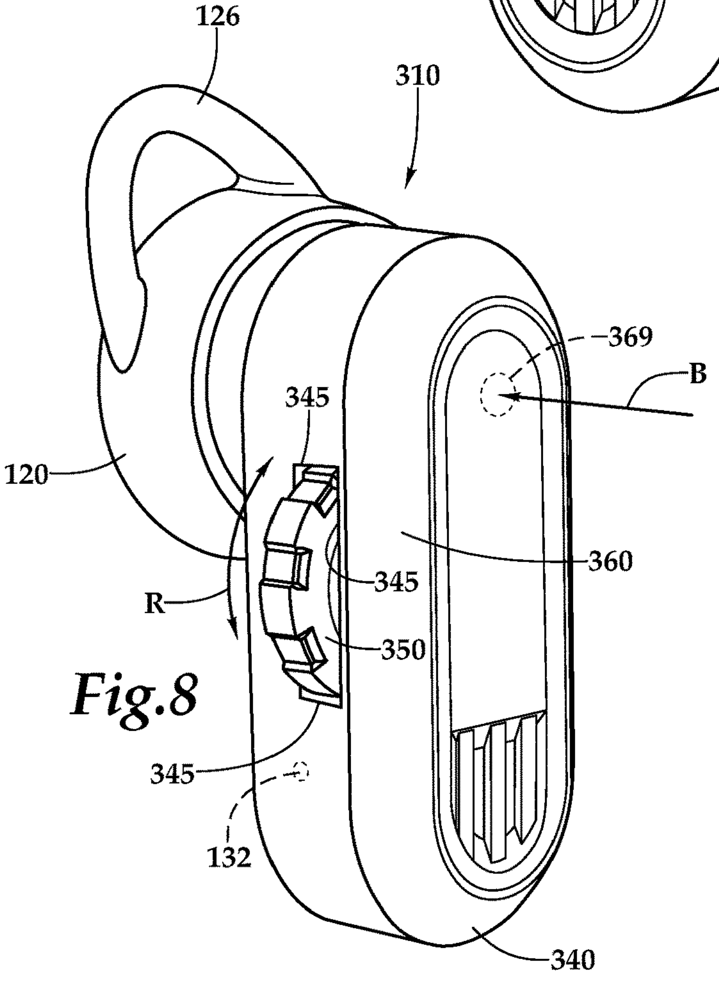
FIG. 8 is a perspective view from a distal side of a further modified alternative earbud featuring an elongate housing and with a turn wheel mostly enclosed within the elongate housing, but protruding sufficiently to facilitate rotation thereof.

With particular reference to FIG. 8, a further modified alternate embodiment earbud 310 is disclosed. This earbud 310 has a similar alternate body 120 and arch bar 126 as those disclosed and association with FIGS. 5 and 6. A quasi-enclosed turn wheel 350 is supported by a further modified elongate housing 340 extending through a lateral port 345 on the further modified elongate housing 340. In this embodiment, less than half of the quasi-enclosed turn wheel 350 extends through this port 345 for engagement by a user and rotation along arrow R. The enclosed turn wheel 350 is supported by a further modified hub 360 integrated into the further modified elongate housing 340 and an optional push button 369 is also associated with this further modified elongate housing 340. Otherwise, the further modified elongate housing 340 and quasi-enclosed turn wheel 350 have similar function to that disclosed in prior embodiments above.

Figure 9:
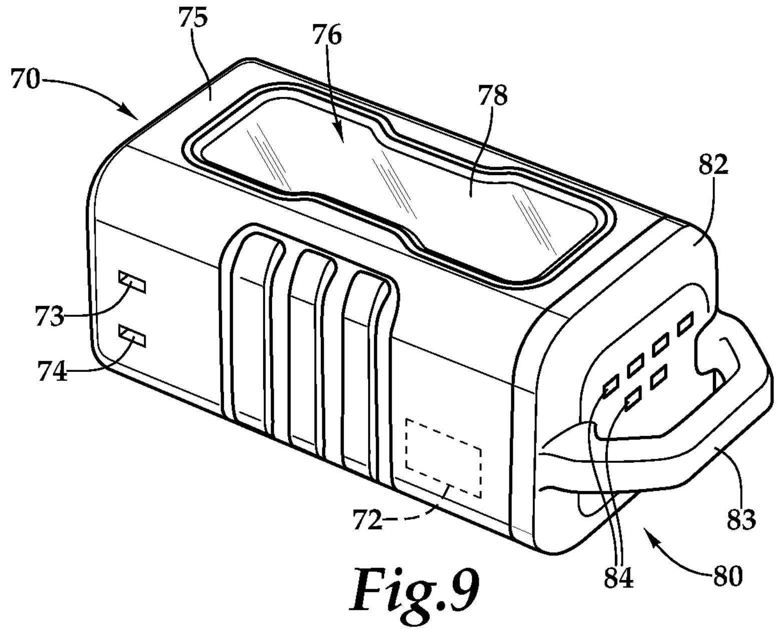
FIG. 9 is a perspective view of a charger box for charging earbuds of FIGS. 1-4 or similar earbuds, the charger box shown in a closed configuration.
Figure 10:
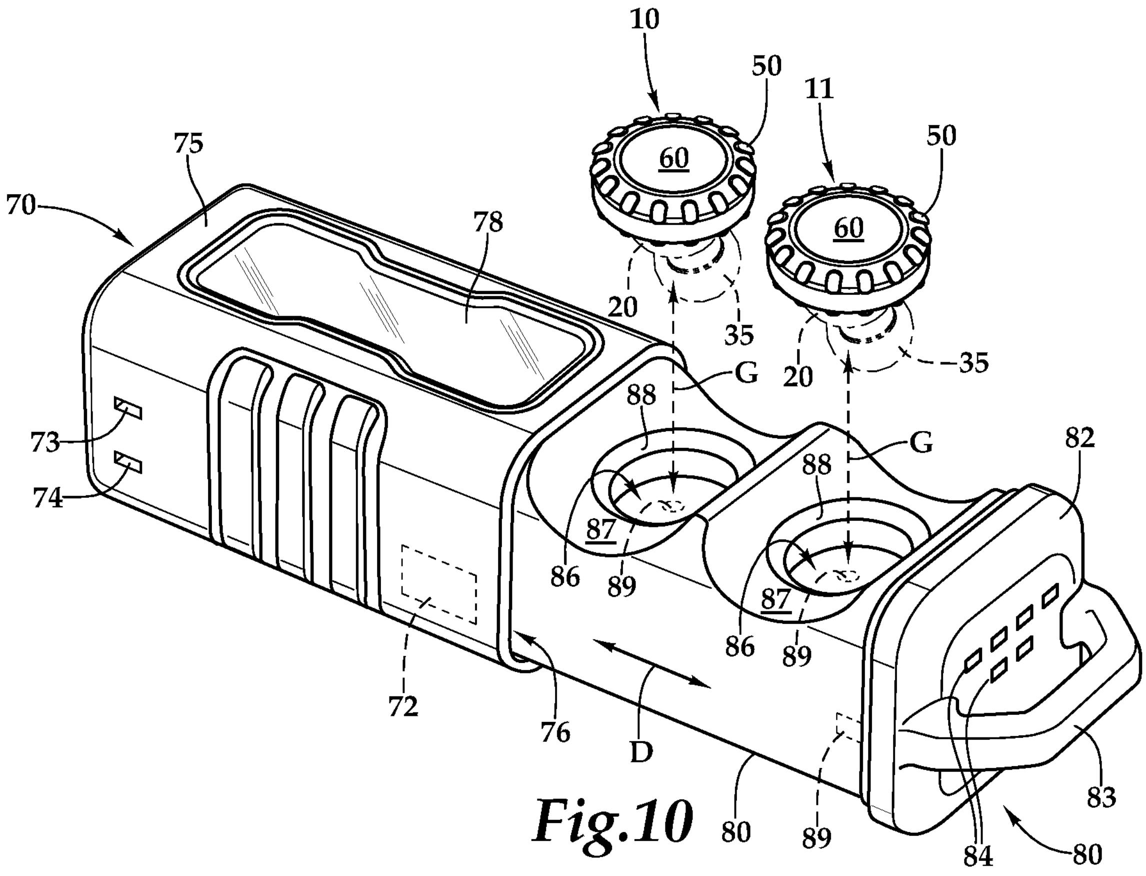
FIG. 10 is a perspective view of that which is shown in FIG. 9, but with the charger box shown in an open configuration and with earbuds exploded away from recesses for holding and wirelessly charging the earbuds

With particular reference to FIGS. 9 and 10, details of a charger box 70 are described which can support earbuds, such as the earbuds 10, 11 for charging and/or storage thereof. The charger box 70 is generally an orthorhombic structure including an outer housing 75 movable relative to a drawer 80. The charger box 70 in one embodiment has a wired power cord coupled thereto to facilitate electric power being supplied to the charger box 70 such as by plugging this cord into a standard electrical outlet. However, most preferably the charger box 70 includes a battery 72 associated therewith so that the charger box 70 can be used without simultaneously being plugged into a source of power, at least as an option. In one embodiment, such a battery 72 is associated with the outer housing 75. In another embodiment, the battery 72 is incorporated into the drawer 80. Electrical connection can be provided between the outer housing 75 and the drawer 80 of the charger box 70 as required, such as for recharging of the battery 72 or for transfer of power from the battery 70 to two locations within the drawer 80 where output charging coils 88 are provided for output of inductive charging with the input charging coils 48 associated with the earbuds 10, 11.

The outer housing 75 also preferably includes an axillary power output port 73 and a power input port 74. These ports can in one embodiment merely be in the form of USB ports or other ports provided according to various different electric power and/or signal transfer protocols. At least one of these ports 73, 74 allows for input of electric power from a cord coupled to a wall outlet or other separate source of electric power. At least one of these ports 73, 74 can optionally allow for other electronic devices, such as personal electronic devices P to be coupled through such an auxiliary power output port 73 and for power to be supplied to such a separate device through the charger box 70.

An interior cavity 76 inboard of the outer housing 75 supports the drawer 80 therein. In one embodiment an upper surface of the outer housing 75 is in the form of a window 78 which facilitates viewing of an interior of the charger box 70 when the drawer 80 is closed. The drawer 80 slides relative to the outer housing 75 (along arrow D of FIG. 10). An upper surface of the drawer 80 includes recesses 86 which can receive the earbuds 10, 11 (along arrow G of FIG. 10).

An end of the drawer 80 most distant from the outer housing 75 is in the form of an outer panel 82. This outer panel 82 can have a handle 83 thereon which facilitates sliding of the drawer 80, along arrow D. Indicator lights 84 are preferably provided on an outer surface of the outer panel 82 which can identify status of the operation of the charger box 70. In one embodiment, two rows of indicator lights 84 are provided. An upper row can have a lesser or greater number of lights illuminated to indicate how much charge is within batteries on the earbuds 10, 11, so that one can readily see if the earbuds 10, 11 are fully charged or not. These lights can be blinking to indicate active charging is happening, or solid if no active charging is happening. Other lights on the outer panel 82 can indicate other operational characteristics of the charger box 70, such as a status of charge of a battery 72 associated with the charger box 70.

The recesses 86 are preferably bounded on two sides by finger slots 87 which allow for convenient grasping of the earbuds 10, 11 when they are located within the recesses 86. The two recesses 86 can be universal to support either a right earbud 10 or left earbud 11, or can be specific to supporting only one of these two earbuds 10, 11. A charging output coil 88 preferably surrounds each of these recesses 86 and is particularly oriented for optimal alignment with the charging input coil 48 associated with each earbud 10, 11. In this way, when the earbuds 10, 11 are located within the recesses 86, high quality alignment for optimal inductive power charging can occur between the charging coils 48, 88.

Sensors 89 associated with the recesses 86 can be provided to determine whether the earbuds 10, 11 are within the recesses 86 or not, and can be utilized to determine whether the charger box 70 delivers power to the charging coil 88 or not. In this way, inadvertent power drain from the battery 72 of the charger box 70 or other electric power waste is avoided or minimized. A sensor 89 can also optionally be provided on the drawer 80 to sense whether the drawer 80 is closed or not. In one embodiment, power is only supplied to the charging coils 88 when at least one earbud 10, 11 is located within at least one of the recesses 86 and the drawer 80 is sensed as being closed by the sensor 89 located upon the drawer 80, strategically for detection of whether or not the drawer 80 is closed.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A wireless earbud, comprising in combination:
a central body having a proximal end opposite a distal end;
a speaker supported by said body, said speaker located closer to said proximal end than to said distal end;
an ear cushion supported by said body, said ear cushion located closer to said proximal end than to said distal end;
an electric power source coupled to said body;
an antenna coupled to said body;
electronics between said antenna, said power source and said speaker, said electronics facilitating playing of a sound file received by said antenna in an audible manner by said speaker;
a turn wheel rotatably supported by said body;
said turn wheel located closer to said distal end than to said proximal end;
said turn wheel controlling a characteristic of the sound file played by said speaker; and
wherein said turn wheel has a resistance force resisting turning of said turn wheel relative to said body, said resistance force being less than a friction force between said ear cushion and an ear canal of a user, such that torque applied to said turn wheel is more likely to turn said turn wheel relative to said body than to turn said ear cushion relative to the ear canal of the user.

2. The earbud of claim 1 wherein said power source includes a battery, said battery within said body of said earbud.

3. The earbud of claim 1 wherein said characteristic of the sound file controlled by said turn wheel includes a volume of sound waves emanating from said speaker.

4. The earbud of claim 1 wherein said characteristic of the sound file controlled by said turn wheel includes control of a track of an audio file played by the earbud, the audio file being a multi-track audio file.

5. A wireless earbud, comprising in combination:
a central body having a proximal end opposite a distal end;
a speaker supported by said body, said speaker located closer to said proximal end than to said distal end;
an ear cushion supported by said body, said ear cushion located closer to said proximal end than to said distal end;
an electric power source coupled to said body;
an antenna coupled to said body;
electronics between said antenna, said power source and said speaker, said electronics facilitating playing of a sound file received by said antenna in an audible manner by said speaker;
a turn wheel rotatably supported by said body;
said turn wheel located closer to said distal end than to said proximal end;
said turn wheel controlling a characteristic of the sound file played by said speaker;
wherein said characteristic of the sound file controlled by said turn wheel includes control of a track of an audio file played by the earbud, the audio file being a multi-track audio file; and
wherein said control of a track includes rotation of said turn wheel in a first direction advancing the track being played from a current track to a next track of the audio file, and rotation of said turn wheel in a second direction opposite said first direction returning the track being played from a current track to a previous track of the audio file.

6. The earbud of claim 1 wherein said characteristic of the sound file controlled by said turn wheel is controlled for each of a pair of earbuds, through wireless communication at least indirectly between said pair of earbuds.

7. The earbud of claim 1 wherein said turn wheel surrounds a hub adjacent to said distal end of said body, with an axial orientation about which said turn wheel rotates being defined by a rotational axis extending along a line between said proximal end of said body and said distal end of said body.

8. The earbud of claim 7 wherein said hub has an outer distal surface inboard of said turn wheel which includes a push button switch which can be pushed to provide an input into said electronics, separate from rotation of said turn wheel.

9. The earbud of claim 7 wherein a microphone is located within an outer distal surface of said hub, inboard of said turn wheel.

10. The earbud of claim 7 wherein said hub is fixed to said body, with said turn wheel rotating about said hub and separate from said hub.

11. The earbud of claim 10 wherein ribs are provided on a perimeter of said turn wheel, most distant radially from said rotational axis.

12. A wireless earbud, comprising in combination:
a central body having a proximal end opposite a distal end;
a speaker supported by said body, said speaker located closer to said proximal end than to said distal end;
an ear cushion supported by said body, said ear cushion located closer to said proximal end than to said distal end;
an electric power source coupled to said body;
an antenna coupled to said body;
electronics between said antenna, said power source and said speaker, said electronics facilitating playing of a sound file received by said antenna in an audible manner by said speaker;
a turn wheel rotatably supported by said body;
said turn wheel located closer to said distal end than to said proximal end;
said turn wheel controlling a characteristic of the sound file played by said speaker; and
wherein said earbud is one of two earbuds provided in a pair, which two earbuds communicate together, and with a turn wheel of a first one of said pair of earbuds controlling a different characteristic of the sound file then a turn wheel of a second one of said pair of earbuds.

13. A personal sound system, comprising in combination:

at least one earbud;

said at least one earbud having a central body with a proximal end opposite a distal end;

said at least one earbud having a speaker supported by said body, said speaker located closer to said proximal end than to said distal end;

said at least one earbud having an ear cushion supported by said body, said ear cushion located closer to said proximal end than to said distal end;

said at least one earbud having an electric power source coupled to said body, said electric power source including a battery and a wireless power input coil coupled to said battery;

said at least one earbud having an antenna supported by said body;

said at least one earbud having electronics between said antenna, said power source and said speaker, said electronics facilitating playing of a sound file received by said antenna in an audible manner by said speaker;

a wireless battery charger including at least one power output coil oriented adjacent to a cradle earbud support to have said output coil oriented relative to said input coil of said earbud to facilitate charging of said battery of said earbud when said earbud resides within said cradle; and wherein said earbud is configured to auto pair with an adjacent personal electronic device wirelessly, for transmission of sound files between said earbud and said personal electronic device, said pairing automatically occurring when said earbud is removed from said wireless battery charger.

14. The sound system of claim 13 wherein said cradle includes wide lateral openings on opposing sides of said cradle, to facilitate fingers easily grabbing said earbud.

15. The sound system of claim 13 wherein said wireless battery charger includes a port to which a power charging cord can attach to supply electric power to the wireless battery charger for charging a battery thereof.

16. A personal sound system, comprising in combination:

at least one earbud;

said at least one earbud having a central body with a proximal end opposite a distal end;

said at least one earbud having a speaker supported by said body, said speaker located closer to said proximal end than to said distal end;

said at least one earbud having an ear cushion supported by said body, said ear cushion located closer to said proximal end than to said distal end;

said at least one earbud having an electric power source coupled to said body, said electric power source including a battery and a wireless power input coil coupled to said battery;

said at least one earbud having an antenna supported by said body;

said at least one earbud having electronics between said antenna, said power source and said speaker, said electronics facilitating playing of a sound file received by said antenna in an audible manner by said speaker;

a wireless battery charger including at least one power output coil oriented adjacent to a cradle earbud support to have said output coil oriented relative to said input coil of said earbud to facilitate charging of said battery of said earbud when said earbud resides within said cradle; and wherein said wireless battery charger includes said cradle within a drawer, said drawer sliding into an outer housing covering said cradle when said drawer is closed, said drawer automatically powering said output coil when said earbud is within said cradle and said drawer is closed.

17. A personal sound system, comprising in combination:

at least one earbud;

said at least one earbud having a central body with a proximal end opposite a distal end;

said at least one earbud having a speaker supported by said body, said speaker located closer to said proximal end than to said distal end;

said at least one earbud having an ear cushion supported by said body, said ear cushion located closer to said proximal end than to said distal end;

said at least one earbud having an electric power source coupled to said body, said electric power source including a battery and a wireless power input coil coupled to said battery;

said at least one earbud having an antenna supported by said body;

said at least one earbud having electronics between said antenna, said power source and said speaker, said electronics facilitating playing of a sound file received by said antenna in an audible manner by said speaker;

a wireless battery charger including at least one power output coil oriented adjacent to a cradle earbud support to have said output coil oriented relative to said input coil of said earbud to facilitate charging of said battery of said earbud when said earbud resides within said cradle; and wherein said wireless battery charger includes two cradles within a drawer, each of said cradles configured to support a different one of a pair of earbuds, said drawer covering said cradles when said drawer is closed, said drawer automatically powering said output coils for each of said cradles when said earbuds are within said cradles and said drawer is closed.

18. The sound system of claim 17 wherein said drawer includes status lights thereon indicating whether said wireless battery charger is actively charging or not, and how much charge remains within a power supply battery of said wireless battery charger.

* * * * *